United States Patent [19]

Dirr

[11] Patent Number: 4,794,621
[45] Date of Patent: Dec. 27, 1988

[54] APPARATUS FOR TRANSMITTING INFORMATION BY ANGLE MODULATION

[76] Inventor: Josef Dirr, Neufahrner Strasse 5, D-8000 München 80, Fed. Rep. of Germany

[21] Appl. No.: 108,328

[22] Filed: Oct. 14, 1987

[30] Foreign Application Priority Data

Aug. 26, 1987 [DE] Fed. Rep. of Germany ....... 3728492

[51] Int. Cl.$^4$ .................. H04L 27/20; H04L 27/22
[52] U.S. Cl. ........................................ 375/52; 375/83; 332/19; 332/9 R; 455/110
[58] Field of Search .................. 375/52, 62, 67, 83; 332/9 R, 16 R, 19, 23 A; 455/110

[56] References Cited

U.S. PATENT DOCUMENTS

| | | | |
|---|---|---|---|
| 3,652,794 | 3/1972 | Vancsa | 375/67 |
| 4,206,425 | 6/1980 | Nossen | 332/19 |
| 4,682,123 | 7/1987 | Loper et al. | 375/62 |

*Primary Examiner*—Robert L. Griffin
*Assistant Examiner*—Marianne Huseman
*Attorney, Agent, or Firm*—Edwin E. Greigg

[57] ABSTRACT

An apparatus for transmitting information by angle modulation wherein the phase angle of an electric wave is varied in response to a modulating signal, which modulating signal comprises portions which effect step-like variations of the phase angle, some of said step-like angle variations involving a variation by an angle which exceeds a predetermined magnitude, and wherein each phase angle variation which exceeds a predetermined magnitude is effected by a plurality of subsequent partial phase variation steps each involving a variation by a phase angle with a fraction of a phase angle variation.

8 Claims, 6 Drawing Sheets

APPARATUS FOR TRANSMITTING INFORMATION BY ANGLE MODULATION

FIELD OF THE INVENTION

The present invention relates to the transmission of information by means of electrical signals, more specifically to apparatus for transmitting information by angle modulation.

BACKGROUND OF THE INVENTION

Angle modulation is the generic term for two closely related types of modulation of an electric wave, namely phase modulation and frequency modulation.

Phase modulation is a modulation method in which the phase angle of a base or carrier wave is varied depending on a parameter, such as the amplitude, of a modulation signal which represents the information to be transmitted. The difference of the instantaneous phase from a reference phase is a function of the instantaneous value of the modulation signal. Frequency modulation is a modulation method in which the difference between the instantaneous value of the frequency of a carrier wave and a reference frequency is a function of the instantaneous value of the modulation signal.

In a known phase modulation method a. two carrier frequency waves having phases differing by a predetermined angle, e.g. 90° are generated,
b. the amplitude of at least one of these waves is modulated by a modulation signal,
c. the waves are then added to form a combined wave.

The amplitude of the combined wave may be limited to suppress amplitude variations.

In a known modification of the above method, both waves are amplitude modulated in push-pull relationship by the modulation signal.

U.S. Pat. No. 3,887,786, incorporated herein by reference thereto, discloses a quadrature amplitude modulation (QAM) method in which the signal values or points, as mapped on the complex plane, are drawn from an alphabet consisting of at least eight points and are set up in concentric rings each rotated by 45° with respect to adjacent rings. respectively, of the signal point to be transmitted. The amplitude modulated pulse trains are low pass filtered and modulate waves of the form $\cos w_c t$ and $\sin w_c t$, respectively, wherein $w_c$ is a carrier frequency. The modulated cosine wave is applied to the non-inverting input of a differential amplifier while the modulated sine wave is applied to the inverting input of the differential amplifier which produces the desired QAM modulated signal at its output.

A modulating signal representing digital information can assume only a number of discrete values which in the case of phase modulation differ by a predetermined incremental phase angle, such as 45°. This causes abrupt phase variations or phase jumps in the phase-modulated signal. An analog modulating signal may also cause abrupt phase variations if the signal parameter, e.g. the signal amplitude, which represents the information to be transmitted, changes aabruptly, as in television signals.

SUMMARY OF THE INVENTION

It has been found that the known angle modulation methods can be improved by substituting a sudden phase variation or jump, which exceeds a predetermined angle, by a plurality of discrete, small angle variations or steps. Thus, in a digital phase modulation method in which the possible phase angles differ by 45°, a series of nine phase jumps or steps of 5 degrees each is executed instead of a single phase variation of 45°. These values are exemplary only and by no means limiting, however, in preferred embodiments of the invention, the individual small phase jumps involve phase variations of no more than 10 degrees preferably no more than 5 degrees, so that each phase variation or step which exceeds 10° (or 5°) is replaced by a corresponding number of smaller, "partial" phase or angle variation steps. The term "abrupt phase variation" or "phase step" is intended to mean in this context a phase variation which is step-like or instantaneous in the context of the circuitry employed.

According to a embodiment of the invention, a method of transmitting information by angle modulation wherein the phase angle of an electric wave is varied in response to a modulating or control signal comprising portions which effect step-like angle variations which involve a variation of the phase by an angle exceeding a predetermined magnitude is characterized in that each step-like angle variation exceeding said predetermined amount is effected by (or subdivided into) a plurality of subsequent partial angle variation steps each involving an variation by an angle which is a fraction of said predetermined magnitude.

A preferred apparatus for retrieving the information from a digitally angle modulated carrier wave at a receiving location comprises the steps: Providing a measuring or gauging signal having a frequency which is a multiple of a nominal frequency of the angle modulated wave, detecting the number of periods of the measuring signal occurring during a number (including 1) of half waves or half periods of the modulated wave and thus the length of the half periods of the angle modulated wave. If the length of the period is smaller than a reference period (corresponding to the period of the unmodulated carrier), this means a phase phase variation in a first (lagging) sense while a period which is longer than the reference period, corresponds to phase variation in the opposite (leading) sense.

BRIEF DESCRIPTION OF THE DRAWINGS

FIG. 4b is a block diagram of a control circuit for the phase modulator of FIG. 4a.

DESCRIPTION OF THE PREFERRED EMBODIMENTS

Figure 1:
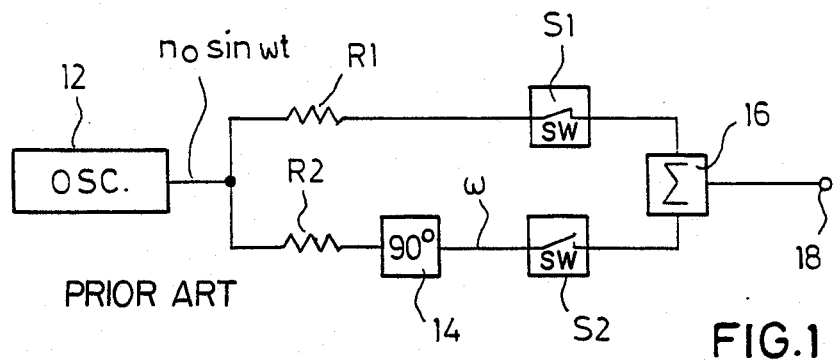
FIG. 1 is a schematic block diagram of an known phase modulation circuit.

Before the description of the preferred embodiments, reference is made to FIG. 1 which shows a known circuit for producing a phase modulated wave adapted to assume three discrete phase states, namely 0°, 45° and 90°. The circuit of FIG. 1 comprises an oscillator 12 for producing a base or carrier wave sin wt. The frequency of the carrier wave is generally much higher than the highest modulation frequency. The output of the oscillator 12 is coupled through a first series combination of a resistor R1 and a switch S1 and through a second series combination of a resistor R2, a 90 degree phase shifting circuit 14 and a second switch s2 to first and second inputs of a combining or summing circuit which has an output terminal 18 at which a phase modulated output signal is produced.

The resistors R1 and R2 have equal values. When switch S1 is closed and switch S2 is open, the summing circuit 16 receives an input signal proportional to $U_0$ sin wt via the first series combination R1, S1. $U_0$ is the amplitude of the output signal of the oscillator 12. Since switch S2 is open, the summing circuit 16 provides an output signal A* sin wt, the phase difference $\phi$ of which with reference to the output signal of the oscillator 12 is zero and A* is proportional to $U_0$/R1.

Figure 2:
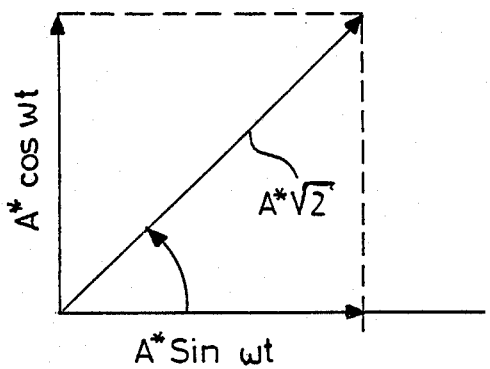
FIGS. 2 and 3 are diagrams for explaining the operation of the circuit of FIG. 1.

When the switches S1 and S2 are both closed, input signals of the same magnitude are applied to the inputs of the summing circuit 16 and the output signal at the terminal 18 has the amplitude $A^* \cdot \sqrt{2}$ and a phsse shift $\phi = 45°$ with respect to the oscillator output signal as shown in FIG. 2. When switch S1 is open and switch S2 is closed, the output signal has again the amplitude A but a phase shift $\phi = 90°$ with reference to the output signal of the oscillator.

Figure 3:
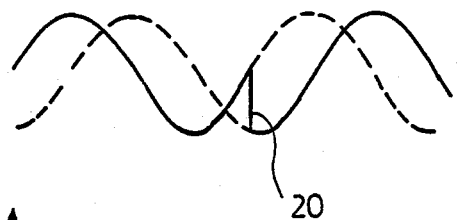

FIG. 3 shows two carier frequency waveforms with phases differing by 90 degrees, as they are present at the inputs of the switches S1 and S2. It is obvious that an abrupt phase variation of phase jump 20 occurs in the output signal at the terminal 18 when the phase is shifted by 90 degrees, i.e. when one of the switches S1, S2 closes and the other opens. Further the amplitude of the output signal is changed when the phase is varied by any angle between 0° and 90°, as it is shown for a phase variation $\phi = 45°$ in FIG. 2.

Preferred embodiments of the present invention avoid abrupt signal changes of greater magnitude by performing instead of a phase jump or step exceeding a predetermined phase angle, a series of subsequent, relatively small "partial" phase variation steps. Further, the peak-to-peak amplitude phase modulated wave is kept constant by varying the amplitudes of the mutually phase shifted waves, which are combined to the output waves, in opposite direction such that the sum amplitude is maintained on a predetermined constant value.

In a digital phase modulation apparatus, in which a plurality of discrete phase angles are possible which differ from phase angle to phase angle by a predetermined value $\phi$, each phase change is subdivided in steps of the magnitude $\phi/n$ wherein $\phi/n$ is no more than 10° preferably no more than 5° or even less. For the reason of immunity against phase jitter, $\phi$ will be generally chosen to be at least 45° and in this case n may be 9 or 10. The incremental or partial phase variation steps should be effected at or near a zero-crossing of the carrier wave; the period of time between two subsequent partial phase variation steps may be a half-period of the carrier wave or a multiple thereof.

In a preferred embodiment of the present method for digital phase modulation, subsequent discrete phase values have mutual distances of 45°, the partial phase variation steps are 5° and the period of time between two subsequent partial phase variation steps is equal to a period of the phase modulated carrier or base wave. The phase changes are effected at the zero-crossings of the carrier or base wave.

Figure 4A:
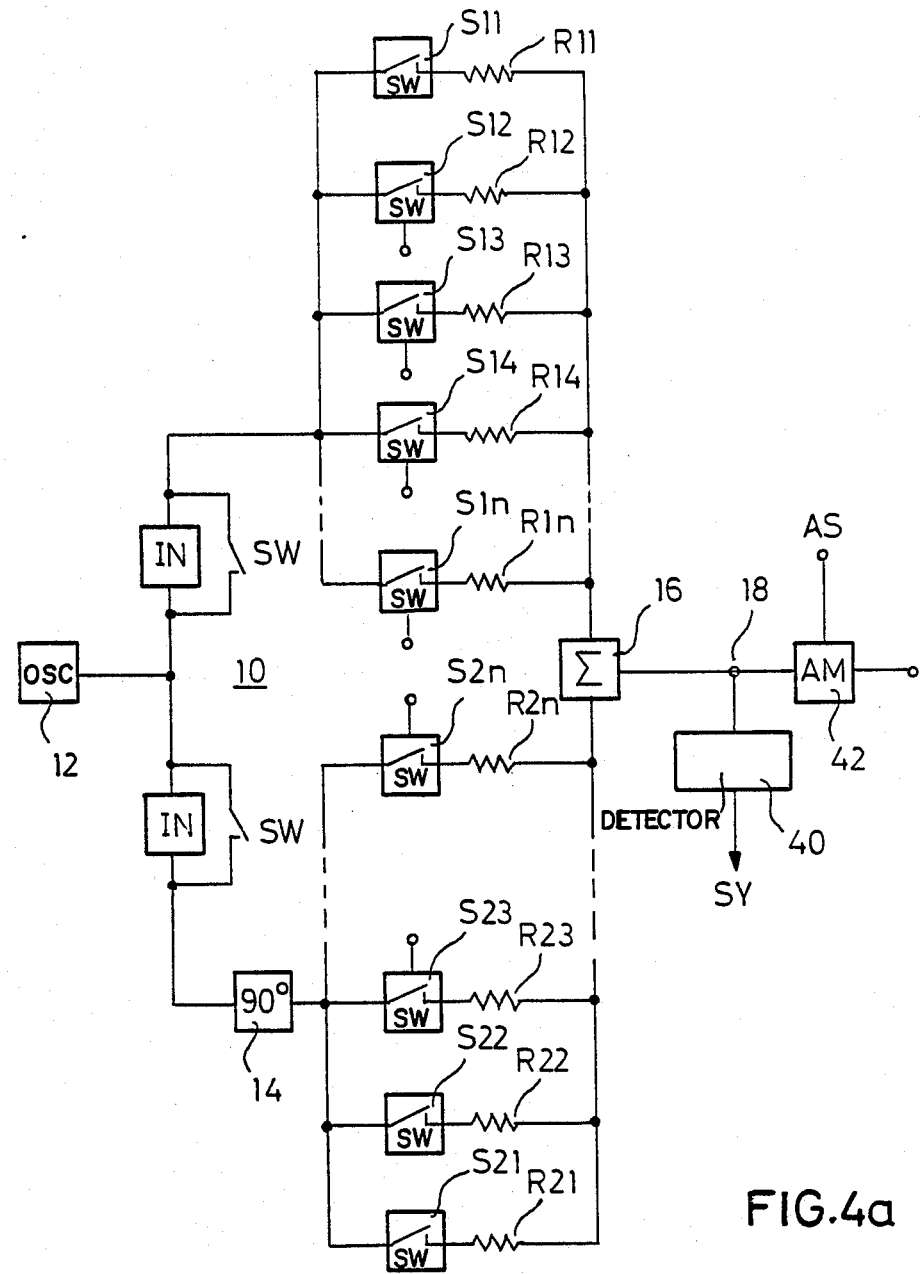
FIG. 4a is a schematic block diagram of a phase modulation circuit according to a preferred embodiment of the present invention.
Figure 4B:
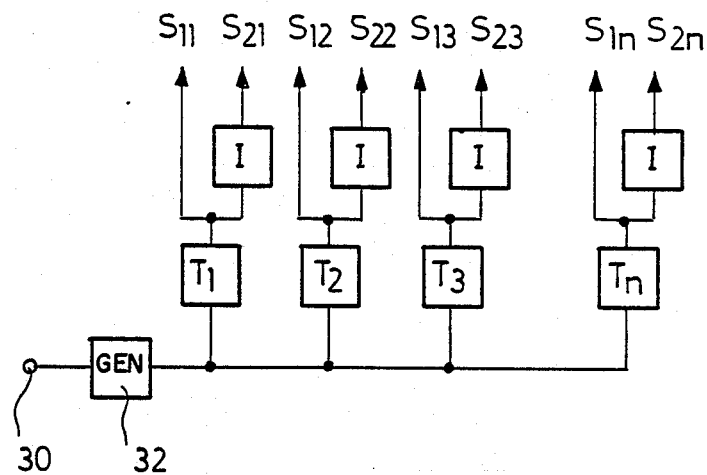

A preferred circuit for producing a digitally phase modulated wave is shown in FIGS. 4a and 4b. The circuit portion shown in FIG. 4a comprises an oscillator 12 for producing a base or carrier wave, and a phase modulator circuit 10 including a number of controlled electronic switches. FIG. 4b comprises the control circuitry for the switches comprised in the phase modulator 10.

Referring to FIG. 4a, the output of the oscillator 12 is coupled to input terminals of a first set of switches S11, S12, S13 ..., S1n and further via a 90 degree phase shifting circuit 14 to the input terminals of a second set of switches S21, S22, S23 ... S2n. The output terminals of the switches S11, ... S1n are each coupled via a corresponding resistor R11, R12, R13 ... R1n, respectively, to a first input of a summing circuit 16. The output terminals of the switches S21 to S2n are each coupled via a corresponding resistor R21, R22, R23, ... R2n, respectively, to a second input of the summing circuit 16. Thus, twice as much series combinations, each comprising a switch and a resistor, exist as partial phase variation steps are necessary to cover the maximum phase variation possible in the system under consideration. Thus, if the maximum possible phase variation is 90°, as it is the case in the system of FIG. 4a (without the elements IN and SW which will be discussed later), and if each partial phase variation step is 5°, n will be eighteen and the phase modulating circuit 10 will comprise 36 switch-resistor series combinations.

A series combination of switches to each of which, with exception of one, a resistor is connected in parallel, may be obviously used instead of the parallel-series combination shown.

The control circuit shown in FIG. 4b has an input terminal 30 which is coupled to the input terminal of a sawtooth or ramp generator circuit 32. The output of the ramp generator 32 is coupled to the input of n threshold circuits T1, T2, T3, ... Tn. The magnitude of the threshold level of the threshold circuits increases in equal steps from T1 to Tn. The threshold level of Tn is chosen so that this threshold circuit will just respond when the amplitude of the output signal of the ramp generator 32 raises to its maximum possible value as will be explained in more detail with reference to FIG. 5.

The threshold circuit T1 which has the lowest threshold level has an output terminal coupled directly to a control input of the switch S11 and via an inverting circuit I to a control input of the switch S21. The output of the threshold circuit T2, which has the second lowest threshold level, is coupled directly to a control input of the switch S12 and through an inverter I to a control input of the switch S22 and so on until the threshold circuit Tn, the output of which is coupled directly to a control input of the switch S1n and via an inverter I to a control input of the switch S2n.

It is assumed for the following explanation of the operation of the circuitry of FIGS. 4a and 4b: The input terminal 30 receives a modulating signal consisting of a sequence of spaced pulses of predetermined length and predetermined repetition rate. The amplitude of the pulses controls the phase shift of the output signal of the summing circuit 16, more specifically, the phase shift is essentially proportional to the pulse amplitude. The ramp generator 32 produces a trapezoidal output signal (curve B in FIG. 5) for each input pulse (curve A in FIG. 5), the beginning of the raising and falling portions of the trapezoidal signal coinciding with the essentially vertically raising and falling edges, respectively, of the pulses A. The amplitude or height of the top portion of the trapezoidal pulses B is proportional to the amplitude of the corresponding pulse A so that the rate of raising and falling of the sloping portions of the trapezoidal pulses is independent of the amplitude of the input pulses A.

During the spaces between the pulses A1, A2, ... no threshold circuit T1 ... Tn responds, thus, all of the switches S11 to S1n are closed, and all of the switches S21 to S2n are open. Thus, a signal which is in phase with the output signal of the oscillator 12 is applied to the first input of the summing circuit 16, the amplitude of this signal being determined by the resistance of the parallel combination of the resistors R11 to R11. Thus, this parallel combination corresponds to R1 in FIG. 1. The second input of circuit 16 receives no input signal, since all of the switches S21 ... S2n are open.

Figure 6:
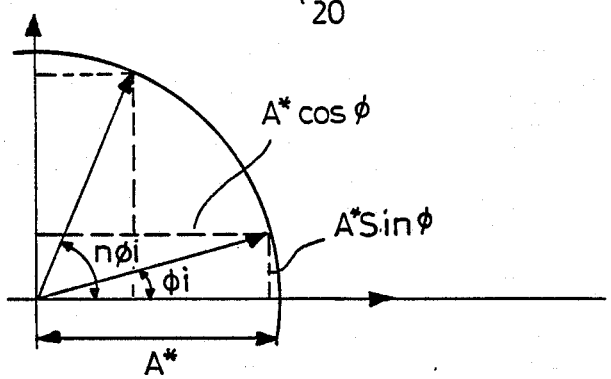
FIGS. 5 and 6 are diagrams for explaining the operation of the circuitry of FIG. 4a and 4b.
Figure 5:
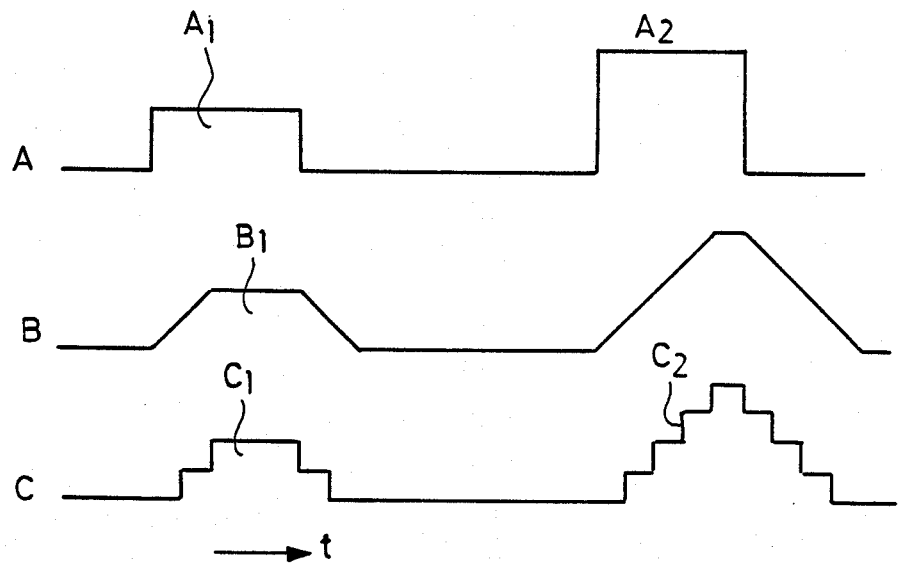

When a pulse R1 of predetermined amplitude appears at the input terminal 30, the ramp generator 32 will produce a trapezoidal output signal B1 of corresponding amplitude. The threshold circuits will now begin to respond one after the other corresponding to the magnitude of the trapezoidal signal. When T1 responds, switch S11 opens and switch S21 closes. Thus, only the parallel combination of the resistors R12 to R1n remains in the current path of the in-phase signal while the resistor R21 is now coupled in the current path of the phase shifted (quadrature) signal. The relationship of the resistances of the resistors are chosen so that the in-phase signal appearing at the first input of the summing circuit 16 has a value proportional to the cosine of the partial phase angle $\phi i$ and that the signal at the second input of the summing circuit is proportional to the sine of this angle so that these signals combine to a wave shifted by the phase angle $\phi i$ with reference to a reference phase corresponding to the in phase signal at the first input terminal of the summing circuit 16, and that, as shown in FIG. 6, the in-phase wave and the quadrature wave at the inputs of the summing circuits 16 combine to a phase shifted wave of the same amplitude as the in phase wave produced between the pulses. Thus, the amplitude of the output signal wave is independent of the phase shift imposed. When the second threshold circuit T2 responds, additionally the switch S12 opens and the switch S22 closes. The resulting resistance relationship causes a phase shift of the magnitude $2\phi i$ and so on, until the threshold circuit has responded which corresponds to the final amplitude of the trapezoidal pulse B. It is assumed in FIG. 5 for the sake of simplicity, that the maximum amplitude which the pulses A can assume, corresponds to four partial phase change steps. The curve C in FIG. 5 shows the phase shift of the output signal for an input pulse A1 of half of the maximum amplitude (2 partial phase change steps) and for a pulse A2 of the maximum amplitude (four phase change steps C2). The ramp generator 32 is dimensioned with respect to the length of the input pulses A so that the maximum possible amplitude of the trapezoidal pulses is assumed before the corresponding input pulse terminates, as shown by the pulses A2 and B2. When the lagging edge of a modulating signal pulse A occurs, the above events are repeated in reverse order, as shown in FIG. 5, thus, the phase change called for by the transition from the input pulse to the pulse space is again subdivided into a plurality of small partial phase change steps.

The partial phase change steps should each be effected at a zero-crossing of the phase modulated wave. Thus, the output signal of the threshold circuits may be synchronized by a synchronizing signal SY produced by a zero-crossing detector 40 coupled to the output terminal 18 of the summing circuit 16, as shown in FIG. 4a.

In a transmission system in which the transmitted signal is both phase and amplitude modulated, as in a QAM system, the signal from the output terminal 18 may be passed through an amplitude modulator 42 controlled by a second, amplitude modulating signal AS. The amplitude modulation may also be effected by an appropriate proportioning of the component signals applied to the input terminals of the summing circuit 16. Thus, a number of parallel combinations of a resistor and a switch may be coupled in series between the resistors R11 to R11 and the first input of the summing circuit 16 and a corresponding circuitry may be provided for the second input of the summing circuit 16. These parallel switches are controlled by an amplitude modulating signal similar as the switches of the phase modulator 10.

If a phase shift range of more than 90° is required, a parallel combination of an inverter IN and a switch SW is coupled in series between the oscillator 12 and each of the two sets of switch-resistor combinations. The inverter IN switch SW combinations allow selectively to shift the phase of the signal in the respective signal path by 180° so that the full 360° phase shift range is available.

Alternatively to the circuit of FIG. 4b, the switches S12...S2n may be controlled by signals derived from output terminals of a counter which is advanced proportional to the magnitude of the phase angle variation or shift to be effected.

Figure 7:
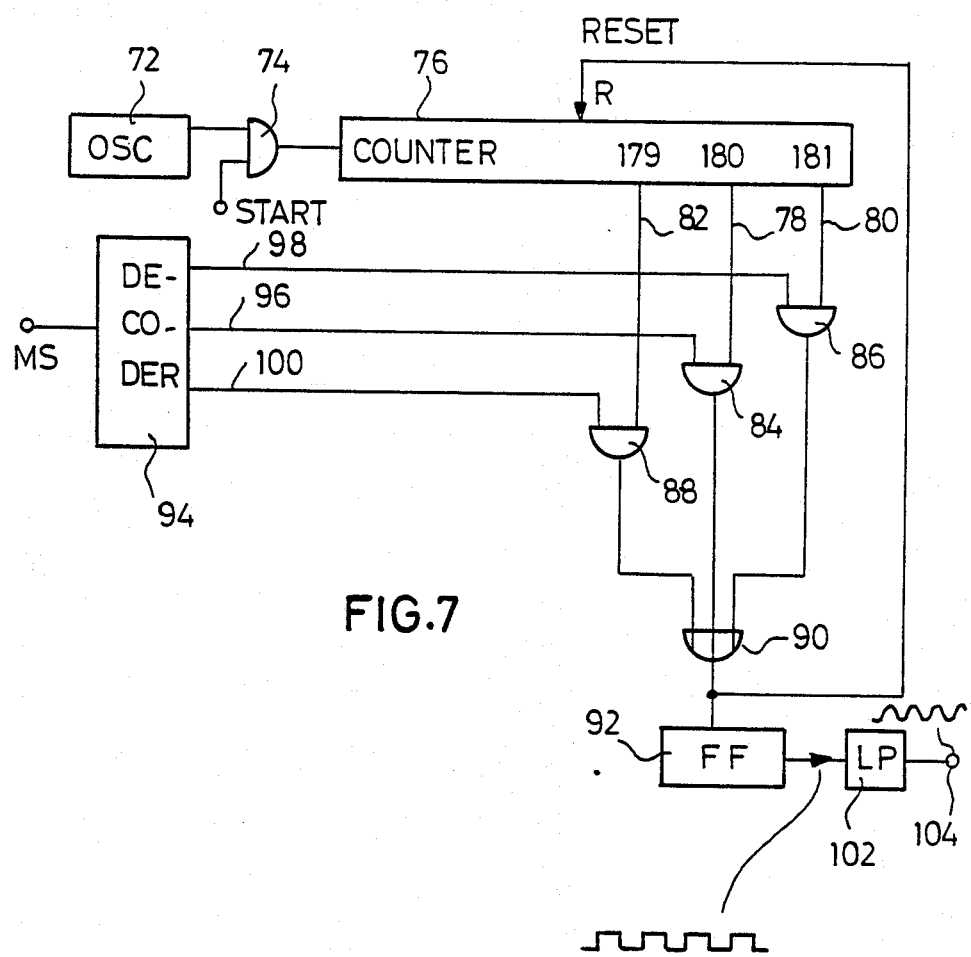
FIG. 7 is a block diagram of a phase modulation circuit according to another preferred embodiment of the invention.

Reference is now made to FIG. 7 which shows a circuit for producing a phase modulated wave according to another aspect of the present invention. This circuit utilizes counting technics and comprises an oscillator 72 which produces an output signal having a frequency F which is a multiple of the base frequency $f_0$ of the phase-modulated wave. More specifically, F may be $f_0$ 720/n wherein n is the partial phase change angle in degrees, i.e. the angle of the incremental phase change steps into which the larger phase variations called for by the modulating signal are subdivided. The output signal of the oscillator 72 is applied through a gate circuit 74, which is primed by a start signal, to a counting input of a counter 76 which has three (or more) output terminals. A first, intermediate output terminal 78 is coupled to a stage of the counter chosen such that an output signal appears at this output, when a period of time corresponding to half a period of the output signal of the frequency $f_0$ has elapsed. A second output terminal is positioned at a higher stage of the counter 76, namely so that an output signal appears at the output 80 when a period of time has elapsed which corresponds to a half period of the output wave of frequency $f_0$ increased by the phase angle n/2. A third output terminal 82 is positioned at an earlier stage 82 so that an output signal appears at that output terminal when a half-period of the output wave shortened by n/2 has elapsed.

The output terminals 78, 80 and 82 are each connected to an input of a corresponding AND gate 84, 86, 88, respectively. The output terminals of the AND gates 84, 86, 88 are coupled to the input terminals of an OR gate 90, the output terminal of which is coupled to an input terminal of a flipflop and further to a reset input R of the counter 76. The output signal of the flipflop 92 changes its state each time when the flipflop receives an input signal from the OR gate 90.

The second input terminals of the AND gates 84, 86, 88 are coupled to corresponding output terminals 96, 98, 100, respectively of a decoder circuit 94 which has an input terminal for receiving a modulating signal MS. The decoder 94 produces at its output 96 a priming signal for the AND gate 84 when the modulating signal calls for maintaining the phase of the output signal. If the modulating signal calls for advancing the phase of the output signal by a phase angle $\phi$, the decoder 94 produces an output signal at the output 98 priming the AND gate 86 for a period of time proportional to $\phi$. The decoder 94 produces an output signal at the output 100 which primes the AND gate 88 when the modulating signal MS calls for shifting the phase of the output signal towards smaller phase angles.

It will be assumed for the following explanation of the operation of the circuit of FIG. 7 that the partial phase change angle or step is 1° for half a period of the output signal. In this case, the output 78 is positioned to produce an output signal when the counter 76 has counted 180 input signal waves or pulses produced by the oscillator 72. The output terminal 80 is positioned so that an output signal is produced when the counter has counted to 181, and the output terminal 72 is positioned so that an output signal is produced at this output when the counter has counted to 179. Under these conditions, the circuit operates as follows:

When the modulating signal is zero (no phase change) and, thus the phase of the output signal of the circuit, which is produced at an output of the flipflop 92, should be maintained constant, the decoder 94 primes the AND gate 84. After each 180 periods of the input signal from the oscillator 72, an output signal appears at the output 78 which is transmitted by the AND gate 84 and the OR gate 90 and switches the state of the flipflop 92. The output signal of the OR gate 90 also resets the counter 76, so that it starts again counting from zero on. Thus, the output of the flipflop 92 is a rectangular wave having a period corresponding to 2×180=360 periods of the output signal of the oscillator 72.

If and when the modulating signal 72 now calls for a phase shift of e.g. +10°, the decoder 94 produces an output signal at the output terminal 98 which primes the AND gate 86. Thus, the flipflop 92 receives an input signal each 181 periods of the oscillator signal and, thus, the flipflop 92 produces a rectangular wave having half periods which are longer by 1°. When ten of these longer half periods have elapsed, the desired new phase angle is obtained and the output signal at the output terminal 98 disappears. Thus, the circuit now delivers again a wave of the nominal period which, however, is shifted in phase by +10° with respect to the previous phase.

If a phase change in negative direction is called for, the decoder produces an output signal of corresponding duration at the output 100 so that the half-periods are shortened by one count, i.e. 1° until the desired new phase angle has been obtained.

The rectangular output signal of the flipflop 92 may be passed through a low pass filter 202 to an output terminal 104 for transmission through a transmission path (not shown) which may be e.g. a cable or a radio link. Instead of a low pass filter, a filter may be used which selects a specific harmonic or set of harmonics (e.g. the 3rd, 5th, 7th . . . ) of the rectangular wave.

It should be obvious that the operation of the circuit of FIG. 7 is in principle indepeneent of the output frequency of the oscillator 72. Thus, the oscillator 72 may be frequency-variable. Further, an output signal of any of three different frequencies can be obtained from the output of the flipflop 92. Pulse trains of a predetermined repetition frequency are available from the output terminals of the AND gates 84, 86, 88. Of course, the circuit of FIG. 7 is not limited to three output terminals of the counter 76, in fact, any desired number of output terminals can be provided to obtain pulse trains of more than three different frequencies from the outputs of the AND gates and rectangular waves of more than three different periods or frequencies at the output of the flipflop 92.

Further, the circuit of FIG. 7 can be easily modified to operate as frequency modulator. The output signals at the output terminals 78, 80, 82 correspond to waves of a predetermined intermediate intermediate or reference frequency, to a wave of a somewhat lower frequency, and to a wave of a somewhat higher frequency, respectively. If a counter having an appropriately high number of stages, e.g. in the order of 1000 and more, is used and a counter output terminal is provided for each discrete frequency value, which the output wave should be able to assume, any desired number of discrete frequencies can be produced. The instantaneous value of the frequency of the output signal is controlled by priming an appropriate AND gate corresponding to the AND gates 84, 86, 88, and the AND gates receive priming signals from the outputs of an appropriate decoder which primes the AND gate corresponding to the desired output frequency.

Figure 8:
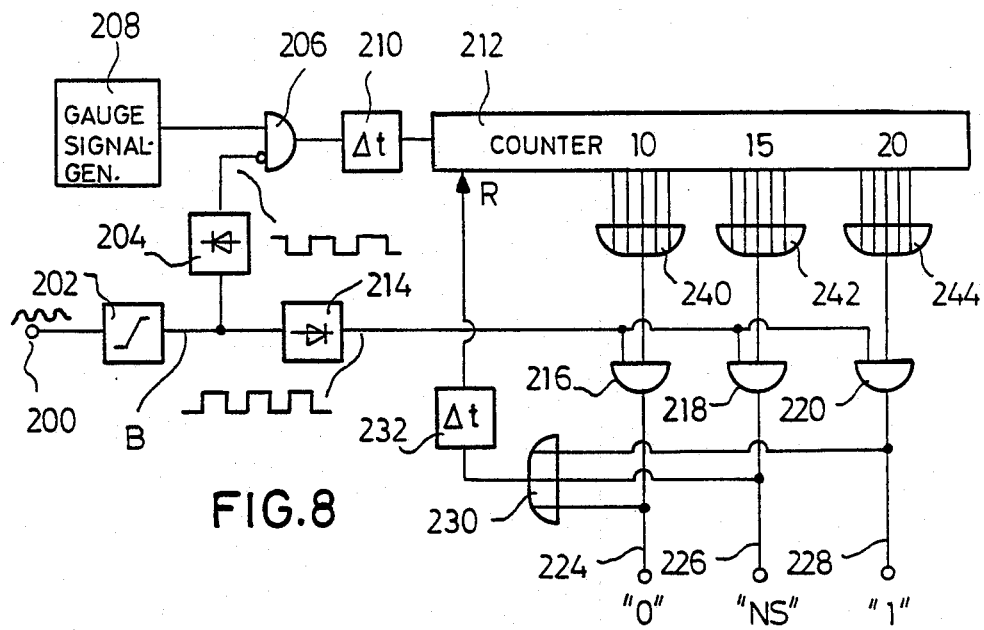
FIG. 8 is a block diagram of a preferred demodulator circuit.

FIG. 8 is a block diagram of a circuit for demodulating a modulated signal produced by a circut of the type described with reference to FIG. 7. An input terminal 200 for receiving the modulated signal is coupled to the input of a limiter circuit 202. The output of the limiter is coupled to first and second half-wave rectifiers 204, 214 of opposite polarity. The output of the rectifier 204 is coupled to an inverting input of an AND gate 206, the other input of which being coupled to a gauge or measuring signal generator 208 which produces a measuring signal of a frequency which is a larger multiple of the frequency of the angle modulated wave. The output of the AND gate 206 is coupled through a delay circuit 210 to a counting input of the counter 212. The output of the rectifier 214 is coupled to a first input of three AND gates 216, 218, 220. The other inputs of the AND gates 216, 218, 220 are each coupled to at least one individual output terminal of the counter 212.

The output terminals of the AND gates 216, 218, 220 are coupled to a corresponding output terminal 224, 226, 228 and to the inputs of an OR gate 230. The output terminal of the OR gate 230 is coupled via a delay circuit 232 to a reset input R of the counter 212.

It will be assumed for the following explanation of the operation of the circuit of FIG. 8, that the input signal 200 receives a quasi-binary information input signal in which a nominal period denotes the state NS (NO SIGNAL) while a period which is longer by 90° than the nominal period, thus a phase shift by +90°, represents the binary value 1, and a period shortened by 90°, thus, a phase shift by −90° represents the binary value 0.

Figure 9:
FIG. 9 is a diagram for explaining the operation of the circuit of FIG. 8.
Figure 9:
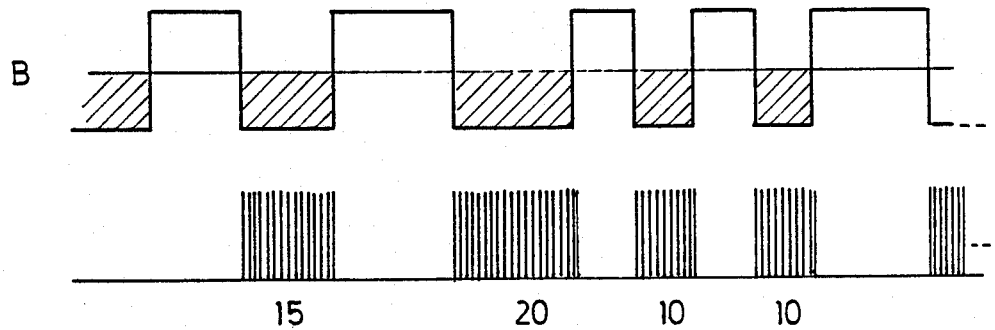

Thus, if the information is e.g. NS1001 as shown in line A of FIG. 9, the limited, rectangular-wave shaped output signal of the limiter 202 has the wave form shown in line B of FIG. 9.

If further assumed that the generator 208 produces measuring pulses of such a frequency that half of the nominal period of the information input signal corresponds to fifteen measuring pulses. It is further assumed that the one way rectifier 204 is poled so that it passes the negative half waves of the limited signal which are hatched in line B in FIG. 9. It is further assumed that the count of the stage of the counter 212 to which the AND gate 218 coupled, corresponds to the number of the measuring pulses which occur during half a nominal period of the input signal (i.e. 15 in the present case), further, that the stage of the counter, to which the AND gate 216 is coupled, corresponds to the number of measuring pulses (i.e. 10) occurring during a "shortened" half wave representing the binary value zero and that the count of the stage, to which the AND gate 220 is coupled, corresponds to the number of the measuring pulses (i.e. 20) occurring during a half wave representing the binary value 1.

To accommodate small variations and noise effects, each two additional counter stages above and below the above mentioned stages are coupled through an OR gate 240, 242, 244, respectively, to the corresponding input of the AND gate 216, 218, 220, respectively.

The circuit of FIG. 8 operates as follows: The negative half waves of the limited signal B (FIG. 9) prime the AND gate 206 so that this gate passes the measuring pulses from the signal generator 208 during each negative half wave. Thus, during one negative half wave the counter counts fifteen measuring pulses when the input signal has the state NS, it counts twenty measuring pulses when the input signal has the state 1 and it counts ten measuring pulses when the input signal has the state 0. The following positive half wave prime the AND gate 216, 218, 220 and an output signal appears at the output terminal 224, 226 or 228 depending on whether ten, fifteen or twenty measuring pulses have been counted during the preceding negative half wave of the input signal. The output signal of the activated AND gate resets the counter 212 after the delay imposed by the delay circuit 232 and the above events are repeated during the following period of the input signal. The output signals at the terminals 224, 226, 228 represent the information conveyed by the modulated signal and can be processed further in any desired manner.

Figure 10:
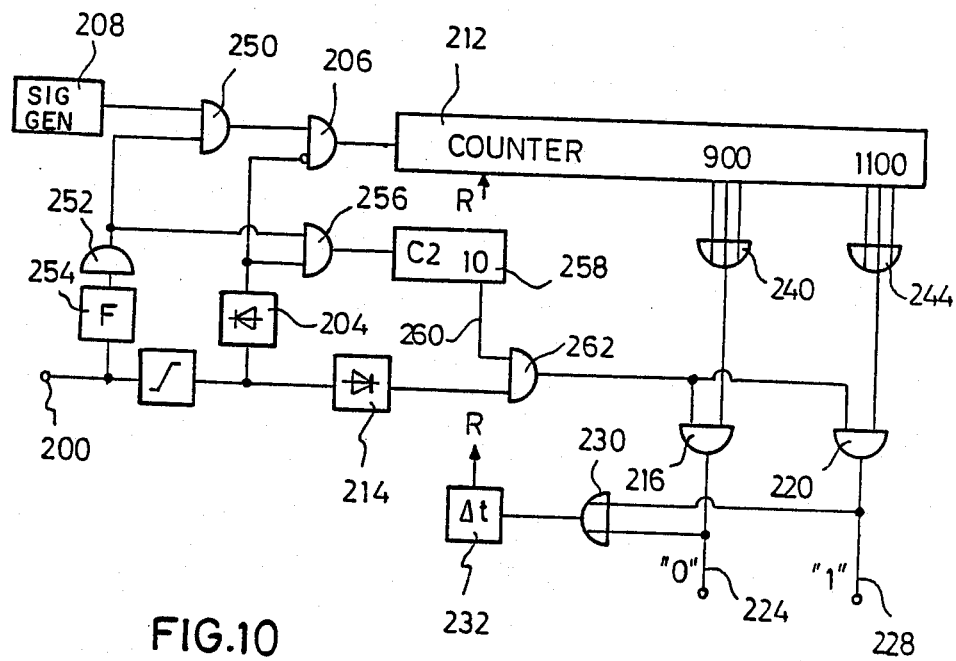
FIG. 10 is a block diagram of another preferred demodulator circuit.

A modification of the circuit of FIG. 8 is shown in FIG. 10 in which elements having similar functions are denoted with the same reference numerals. The operation of the circuit of FIG. 10 differs from that of FIG. 8 mainly in that the measuring pulses occurring during a plurality of negative half waves of the input signal B (FIG. 9) are counted, 10 being an appropriate but no limiting value. The digital input signal corresponding to the signal A in FIG. 9 is coded so that each binary digit 1 or 0 is represented by 10 (or another suitable plurality) periods of the signal B. It is assumed for the following explanation, that the binary digit 1 is represented by ten input signal periods which each are 10% longer than the nominal period while the binary digit 0 is represented by ten periods of the input signal which each are 10% shorter than the reference period.

The circuit of FIG. 10 differs from the circuit of FIG. 8D mainly by the following: The output of the measuring pulse generator 208 is coupled to the AND gate 206 through a gate circuit 250 which receives a gating signal from an inverter 252. The input of the inverter 252 is coupled to the output of a frequency discriminator 254 having its input coupled to the input terminal 200 and operating as NS detector. The output terminal of the one way rectifier 204 is further coupled to an input terminal of an AND gate 56, the other input of which being coupled to the output terminal of the inverter 252. The output terminal of the AND gate 256 is coupled to an input of a second counter 256, which has an output terminal 260 at which an output signal appears when ten negative half waves of the input signal have been counted. The output 260 of the counter 258 is coupled to a first input terminal of an AND gate 262 having a second input terminal coupled to the output terminal of the one way rectifier 214 which passes the positive half waves of the input signal. The output terminal of the AND gate 262 is coupled to the priming or gating inputs of the AND gate 216 and 220. The elements 218, 226 and 242 of FIG. 8 are omitted.

The circuit of FIG. 10 operates as follows: When the input signal has the reference period corresponding to the state NS, the discriminator 254 produces an output signal which is inverted by the inverter 252, and, thus, deactivates the gate circuits 250, 256. Thus, the counters 212, 258 receive no input signal. When the data transmission commences, i.e. signal periods representing the binary digits 1 and 0 appear, the output signal of the discriminator 254 disappears so that the gate circuits 250, 256 become transmissive. The counter 212 starts counting the measuring pulses from the generator 208 during the following subsequent negative half waves of the input signal while the counter 258 starts counting the negative half waves of the input signal. When ten negative half waves have been counted, an output signal appears at the output 260 of the second counter 258 so that the next positive half wave from the one way rectifier 240 is transmitted by the AND gate 262 to the AND gates 216, 220. Depending on whether the last ten negative half waves have been short or long corresponding to the binary digits 0 or 1, an input signal is applied from the counter to the AND gate 216 or 220 which is passed to the corresponding output terminals 224, 228, respectively and constitutes the output signal of the circuit. Thus, if a short half wave lasts ninety measuring pulses and a long half wave lasts 110 measuring pulses, the counter 212 will count to 900 or to 1100. The counter does not need an output terminal for the reference period or no signal state NS since the reference period of the input signal is detected by the frequency detector 254 and is used as start and stop signal. If an output signal corresponding to the reference period is desired, it can be obtained from the output of the discriminator 254.

The described embodiments and values are only exemplary and various changes and modifications will occur to those skilled in the art.

What is claimed is:

1. An apparatus for generating an angle modulated electric wave of a predetermined nominal frequency, comprising generator means for generating a signal of a frequency which is a multiple of said nominal frequency, a counter having an input terminal coupled to an output terminal of said generator means and having at least two output terminals, each of said output terminals producing an output signal at a predetermined count of said counter, gate means coupled to each of said output terminals, each said gate means having an activation input, a decoder having an input terminal for receiving a modulating signal and an output terminal for each of said gate means for acitvating one of said gate means in response to a phase shift determining parameter of said input signal, means having a control input coupled to the output of each of said gate means and having an output terminal for providing a signal which changes its state upon receipt of an input signal at said control input.

2. An apparatus for producing an angle modulated electric wave, comprising generator means for producing a basic waveform,
phase shifting means,
first and second current path means each having one terminal coupled to receive said basic waveform, and a second terminal, said first current path means comprising a first set of switches and resistors, each of said first set of switches having a control terminal for controlling the state (open, closed) of the respective first set switch, said second current path means comprising a second set of switches and resistors, each of said second set of switches having a control terminal for controlling the state (open, closed) of the respective second set switch, and phase shifting means being serially connected with said second set of switches and resistors in said second current path means, signal combining means having first and second input terminals coupled to said second terminals of said current path means, and an output terminal, control means having an input terminal for receiving a modulating signal, and a plurality of output terminals, said plurality of output terminals being coupled to said control terminals of said first and second set of switches, and said control means controlling said first and second set of switches to produce, at said output terminals of said combining means, an electric wave angle modulated in response to said modulating signal.

3. The apparatus as claimed in claim 2, wherein each of said first and second current path means comprises a plurality of series combinations each including a switch and a resistor of the respective first and second set, said series combinations being coupled in parallel to each other between said first and second terminals of the respective current path means.

4. The apparatus as claimed in claim 2, further comprising phase inverting means coupled in series with at least one of said first and second current path means, and switch means for selectively activating said phase inverting means.

5. The apparatus as claimed in claim 2, further comprising synchronizing means for synchronizing the actuation of said first and second set of switches with said electric wave.

6. An apparatus for deriving information from an angle modulated electric wave which has a predetermined nominal frequency and nominal period, comprising generator means for producing a signal having a frequency which is a multiple of said nominal frequency, counter means having an input terminal coupled to said generator means and having at least first and second output termnals at which an output signal appears at first and second counts of said counter, respectively, gate means having a first input terminal coupled to an individual output terminal of said counter, and a second input terminal, control means having a modulation signal input terminal, and controlling said counter to count signal periods of said generator signal to establish the signal freqeuncy of said generating means during a counting period including at least one half period of an input signal applied to said input terminal and further controlling said gate means to pass any output signal appearing at said counter output terminals when said control means has terminated said counting period.

7. The apparatus as claimed in claim 6 wherein said control means further comprises second counter means to activate said gate means after having counted a predetermined number of half waves of the input signal.

8. The apparatus as claimed in claim 7, wherein said second counter means is arranged to count alternating half waves of said input signal.

* * * * *